United States Patent
Burgun et al.

(10) Patent No.: US 8,065,868 B2
(45) Date of Patent: Nov. 29, 2011

(54) SYSTEM, METHOD, AND APPARATUS FOR CONTROL INPUT PREDICTION AND STATE VERIFICATION OF FLUIDIC VECTORING EXHAUST IN HIGH PERFORMANCE AIRCRAFT

(75) Inventors: Rob S. Burgun, Forth Worth, TX (US); Kerry B. Ginn, Weatherford, TX (US); Daniel N. Miller, Bainbridge Island, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 1376 days.

(21) Appl. No.: 11/615,050

(22) Filed: Dec. 22, 2006

(65) Prior Publication Data

US 2008/0149742 A1  Jun. 26, 2008

(51) Int. Cl.
*F02K 1/00* (2006.01)
*F02K 1/28* (2006.01)
*B64C 15/00* (2006.01)

(52) U.S. Cl. ... 60/231; 60/228; 239/265.17; 239/265.19

(58) Field of Classification Search .................... 60/782, 60/785, 232, 228, 230, 231; 239/265.17, 239/235.19, 265.19
See application file for complete search history.

(56) References Cited

U.S. PATENT DOCUMENTS

| | | | |
|---|---|---|---|
| 5,442,909 A * | 8/1995 | Snow et al. | 60/204 |
| 5,553,502 A * | 9/1996 | Hsieh | 73/724 |
| 6,381,950 B1 * | 5/2002 | Whaites et al. | 60/264 |
| 6,470,669 B2 * | 10/2002 | Jones et al. | 60/231 |
| 6,679,048 B1 * | 1/2004 | Lee et al. | 60/204 |
| 6,758,032 B2 * | 7/2004 | Hunter et al. | 60/231 |
| 6,962,044 B1 * | 11/2005 | Miller et al. | 60/230 |
| 7,509,797 B2 * | 3/2009 | Johnson | 60/228 |
| 7,533,517 B2 * | 5/2009 | Beutin et al. | 60/231 |
| 2002/0157399 A1 * | 10/2002 | Dujarric | 60/770 |
| 2003/0070417 A1 * | 4/2003 | Plumpe, Jr. | 60/230 |

* cited by examiner

*Primary Examiner* — William Rodriguez
*Assistant Examiner* — Young Choi
(74) *Attorney, Agent, or Firm* — Bracewell & Giuliani LLP

(57) ABSTRACT

A non-invasive system, method, and apparatus for control input prediction and state verification of an aircraft's fluidic vectoring exhaust is disclosed. The control system derives a desired vector state, then predicts and sets the fluidic injection input required to produce the desired vector state. A vectored state verification routine is used to determine the resulting vector state for feedback to the control system.

14 Claims, 3 Drawing Sheets

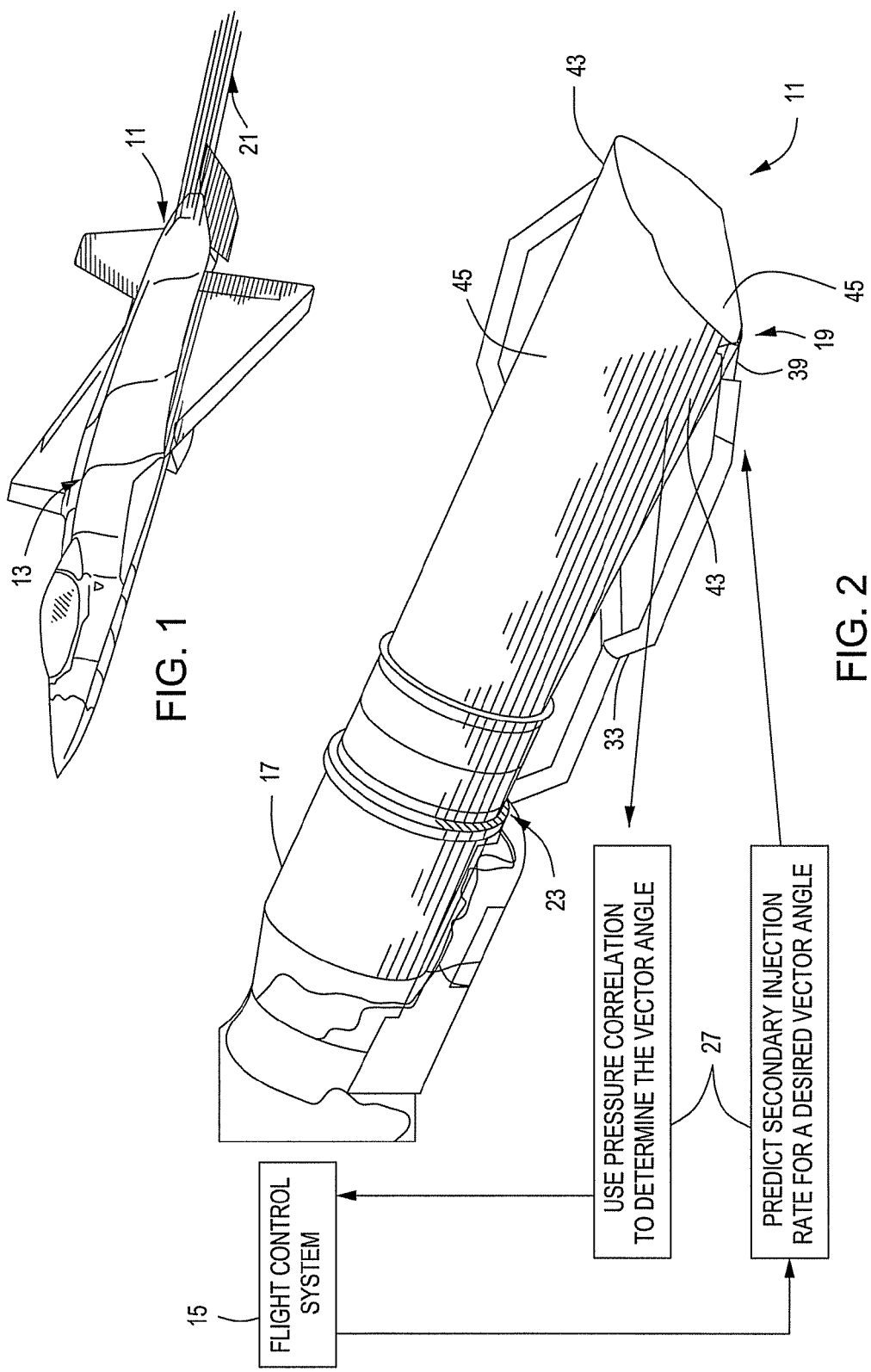

SYSTEM, METHOD, AND APPARATUS FOR CONTROL INPUT PREDICTION AND STATE VERIFICATION OF FLUIDIC VECTORING EXHAUST IN HIGH PERFORMANCE AIRCRAFT

BACKGROUND OF THE INVENTION

1. Technical Field

The present invention relates in general to directing the exhaust of an aircraft to improve its agility in flight and, in particular, to an improved system, method, and apparatus for control input prediction and state verification of a high performance aircraft's fluidic vectoring exhaust system.

2. Description of the Related Art

The exhaust nozzles of conventional jet aircraft typically direct the exhaust flow along a central axis of the nozzle. In order to improve the agility of high performance aircraft, vectoring nozzles have been used to redirect the exhaust slightly off-axis. Historically, vectoring nozzles have used mechanical systems to redirect the exhaust flow. Such mechanical systems usually employ plates or the like that are located adjacent to the nozzle to channel the exhaust flow in the desired direction. However, the need for aggressive next-generation designs with complex geometric shaping has placed an emphasis on moving away from mechanical systems.

One potential alternative to mechanical vectoring nozzles is fluidic vectoring nozzles. In contrast to most prior art designs, fluidic vectoring exhaust systems theoretically should not employ any mechanical moving parts to alter the direction of the exhaust plume, and therefore would have no physical surface deflection to measure and correlate to the desired vector state. Consequently, a significant problem encountered during the development of fluidic vectoring nozzles has centered on how to verify the vector state of the exhaust plume. An integrated flight control system would require both (1) a means for commanding a specific vector angle, and then (2) a means for verifying what vector angle resulted (i.e., feedback) to allow corrections so that the desired vector angle is actually produced. Thus, a solution for fluidic thrust vectoring exhaust systems that is non-intrusive and encompasses an exhaust vector state input prediction and verification scheme that can be implemented in a flight control system would be desirable.

SUMMARY OF THE INVENTION

One embodiment of a system, method, and apparatus for control input prediction and state verification of an aircraft's fluidic vectoring exhaust is disclosed. The invention predicts inputs required to produce a vectored state (e.g., pitch, yaw, etc.) and then verifies the resulting vectored state actually produced in a fluidic vectoring nozzle. The first step in the scheme is prediction of the fluidic control input needed to produce a desired vector state of the exhaust plume. For example, when an aircraft flight control system determines the need for a specific vector state, it utilizes a prediction method for determining the injected flow inputs required to obtain the desired vector state. After these inputs are commanded, a feedback loop is necessary to relay back to the control system the vector state that was actually produced.

The input prediction may be based on vectoring test data, high fidelity computational fluid dynamics (CFD) analysis, or other methods known to those skilled in the art. A correlation is derived between thrust vector state and ratios of injected flow pressure to nozzle flow pressure, and of nozzle flow pressure to local atmospheric pressure. When a given thrust vector angle is commanded, the injected flow pressure is adjusted to the corresponding pressure indicated by the pressure ratio correlations.

The vectored state verification of the fixed nozzle's exhaust plume is derived from nozzle wall pressures and a correlation factor that was derived by looking at a control volume encompassing the exhaust system. The control volume encompassing the fluidic nozzle yields known inflow characteristics, and pressure changes ($\Delta P$) multiplied by area segments ($\Delta PdA$) on the nozzle walls and exit conditions. During vectoring conditions the $\Delta PdA$ is non-zero because the injected flow changes the pressure distribution on the nozzle walls.

Through the use of vectoring test data or CFD, a direct correlation between nozzle wall pressures and vector angle is established. In addition, the ratio of the vector angle to a function of the nozzle wall pressures is constant at given ratios of nozzle pressure to ambient pressure. As a result, a direct correlation between the nozzle wall pressures and vector angle is established.

Overall, the control system derives a desired vector state, then predicts and sets the fluidic injection input required to produce the desired vector state. Finally, a vectored state verification routine is used to determine the resulting vector state for feedback to the control system. The invention offers a robust solution that accomplishes a mechanically non-invasive, fluidic nozzle vector control in a next generation, advanced nozzle configuration. In addition, the feedback feature allows compensation for valve wear, leakage, etc.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention, which will become apparent, are attained and can be understood in more detail, more particular description of the invention briefly summarized above may be had by reference to the embodiments thereof that are illustrated in the appended drawings which form a part of this specification. It is to be noted, however, that the drawings illustrate only some embodiments of the invention and therefore are not to be considered limiting of its scope as the invention may admit to other equally effective embodiments.

FIG. 1 is an isometric view of one embodiment of an aircraft constructed in accordance with the present invention;

FIG. 2 is an isometric view of one embodiment of a fluidic vectoring system for the aircraft of FIG. 1 and is constructed in accordance with the present invention;

DETAILED DESCRIPTION OF THE INVENTION

Figure 3:
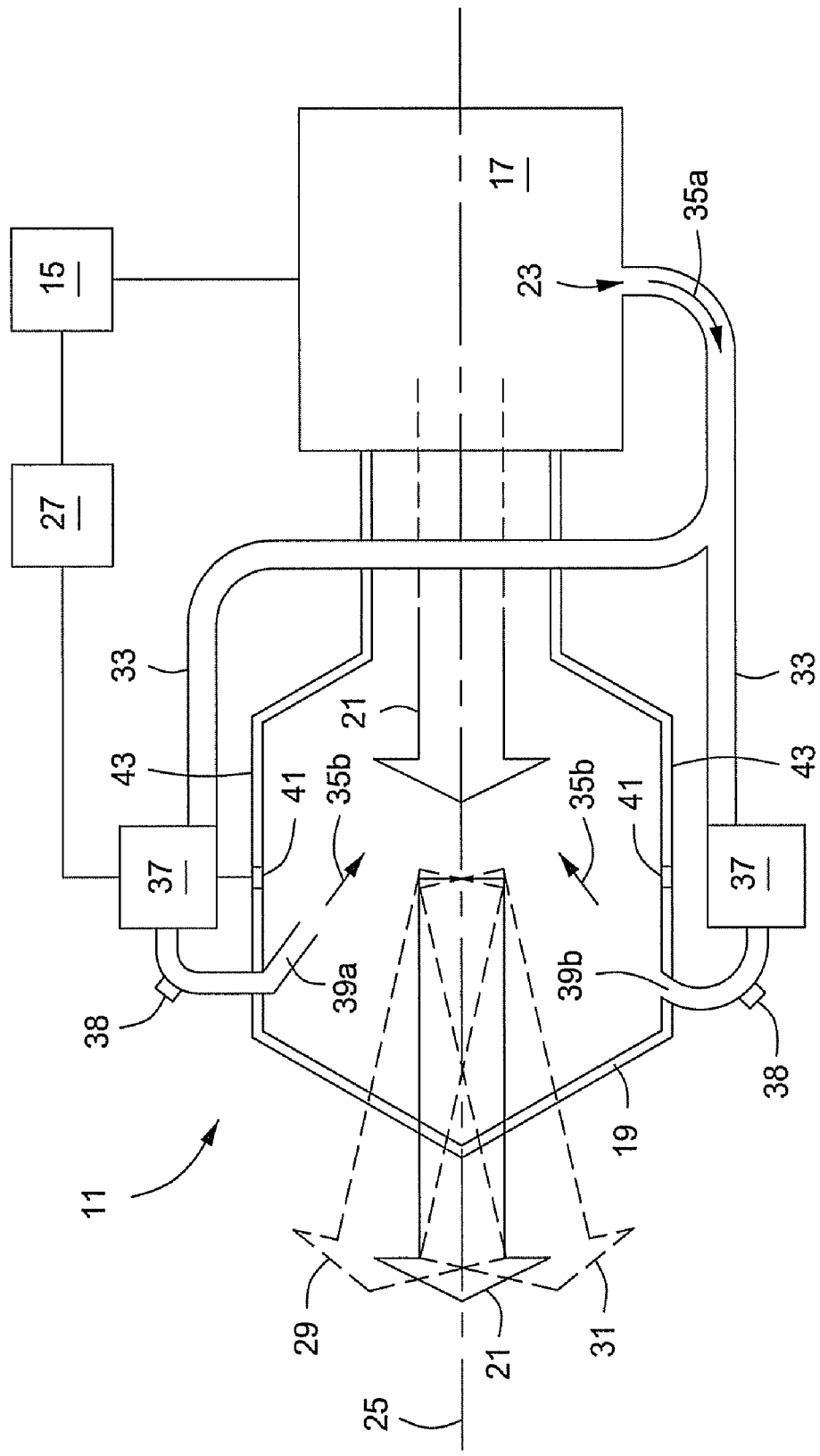
FIG. 3 is a schematic plan view of a portion of the fluidic vectoring system of FIG. 2 and is constructed in accordance with the present invention.

Referring to FIGS. 1-4, one embodiment of a system, method, and apparatus for a fluidic vectoring exhaust system is shown. The invention is well suited for high performance aircraft applications, such as the system 11 on aircraft 13 depicted in FIG. 1. Additional details of the invention are illustrated in FIGS. 2 and 3, including a flight control system 15 for controlling and monitoring various flight sub-systems, parameters, etc., of the aircraft 13. For example, flight control system 15 may be integrated with the control system for an engine 17 and nozzle 19. In the embodiment shown, nozzle 19 is a single nozzle in a mechanically "fixed" configuration meaning that it has no moving parts. Nozzle 19 is located downstream from the engine 17 for releasing an exhaust plume 21 (FIGS. 1 and 3) from the engine 17. Engine bleed port(s) 23 provide high pressure bleed air from the engine 17 for use in a fluidic off-take or duct system 33. In the embodiment shown, nozzle 19 defines a central axis 25 (FIG. 3) that may or may not extend coaxially with engine 17.

The system 11 further comprises a fluidic vectoring control system or controller 27 that is responsive to the overall flight control system 15. Alternatively, fluidic vectoring controller 27 may be partially or completely integrated into the flight control system 15, depending on the application. Fluidic vectoring controller 27 is designed to modify or "vector" the nominal direction of the exhaust plume 21. As best shown in FIG. 3, exhaust plume 21 is typically released from nozzle 19 along axis 25. However, with the invention, the exhaust plume 21 may be used to enhance the maneuverability and agility of the aircraft 13 by temporarily redirecting the plume 21 in other directions indicated by, for example, the dashed line arrows 29, 31. Accordingly, the invention permits direction of the exhaust plume 21 to be altered in various different off-axis vector directions with respect to the nominal or axial direction.

In one embodiment, the fluidic vectoring controller 27 manipulates and controls a number of components, including the fluidic duct system 33 for bleeding off a portion 35a of the flow through the engine 17. The locations of the exit ports for portions 35a are schematic in nature and are not intended to limit the invention to such positions. For example, the fluidic duct system 33 may remove portions 35a from one or more bleed port sources 23 such as engine compressor bleed and engine fan bleed. In the embodiment shown, two portions 35a are shown being removed from engine port 23 for a yaw control application. However, it should be apparent to those skilled in the art that more or fewer portions of the engine flow may be removed for yaw or pitch control of the aircraft 13, or combinations thereof.

The fluidic off-take system 33 may comprise one or more valves 37, such as fluidic actuation valves, for controlling a flow rate of the portions 35a of the engine flow. Injector pressure sensors 38 may be used to set the predicted control input. An injection system or "injector" 39 (e.g., two shown) extends from the fluidic off-take system 33, downstream of valves 37, into the nozzle 19. Injectors 39 may be provided flush with the interior surfaces or walls of nozzle 19 (see lower injector 39b) such that the system is mechanically non-invasive relative to nozzle 19. Alternatively, the system may extend into an interior volume of nozzle 19 (see, e.g., upper injector 39a) directly in a path of exhaust plume 21. In either embodiment, injectors 39 may be used to at least somewhat laterally or opposingly inject or reintroduce the portion 35b of the engine flow into the nozzle 19. Selective actuation of system 11 may be used to change a vector direction of the exhaust plume 21 off of axis 25 (e.g., directions 29, 31, etc.) as the exhaust plume 21 exits the nozzle 19.

The invention further comprises verification that the vector direction of the exhaust plume 21 is substantially equivalent to the desired off-axis vector direction prescribed by the fluidic vectoring controller 27. In one embodiment, the verification comprises pressure sensors 41 for sensing pressure in different locations inside the nozzle 19. Fluidic vectoring controller 27 correlates the sensed pressure from sensors 41 to determine the vector direction of the exhaust plume 21. In the embodiment shown, the pressure sensors 41 are located upstream of the injectors 39 relative to the exhaust plume 21.

In one exemplary embodiment, the nozzle 19 has an expansion section with an elliptical cross-sectional shape (FIG. 2) with side walls 43, and upper and lower panels 45 extending between the side walls 43. The injectors 39 are located on the side walls 43 for manipulating, e.g., a yaw of the aircraft 13 by reinjecting the portion 35b of the engine flow. The verification system 41 senses pressure on the side walls 43 to verify the resultant vector direction of the exhaust flow. In one embodiment, the fluidic vectoring controller 27 uses a prediction method for determining injected flow inputs 35b required to obtain the desired off-axis vector direction 29, 31. After the injected flow inputs 35b are commanded, the verification system 41 provides a feedback loop to the fluidic vectoring controller 27 to confirm that the desired off-axis vector direction was actually produced.

In still another embodiment, the invention may be characterized as an exhaust system 11 comprising a fluidic vectoring nozzle 19 having an axis 25 and adapted to exhaust a plume 21 in an axial direction. The exhaust system 11 further comprises an exhaust control system 27 for predicting a fluidic input 35b required to produce a desired vectored direction of the plume that is off-axis of the axial direction, and verifying a resulting vectored direction of the plume actually produced. Furthermore, if needed, the fluidic input 35b is corrected until the resulting vectored direction matches the desired vector direction. As described above, the exhaust control system 11 predicts the fluidic input 35b by determining injected flow inputs required to obtain the desired vector direction 29, 31. For example, the fluidic input may based on vectoring test data and/or high fidelity computational fluid dynamics (CFD) analysis.

The resulting vectored direction is verified with a feedback loop to the exhaust control system 27 that the desired vectored direction was actually produced. The exhaust control system 27 uses correlations derived between thrust vector directions and ratios of injected flow pressure to nozzle flow pressure, and of nozzle flow pressure to local atmospheric pressure, such that when a given thrust vector direction is commanded, the injected flow pressure is adjusted to a corresponding pressure indicated by the correlations. The vectored direction verification of the plume is derived from pressures on walls of the nozzle and a correlation factor derived from a control volume encompassing the exhaust system that yields known inflow characteristics, pressure changes ($\Delta P$) multiplied by area segments ($\Delta PdA$) on the nozzle walls, and exit conditions from the nozzle, such that during vectoring conditions the $\Delta PdA$ is non-zero since the injected flow changes a pressure distribution on the nozzle walls. In one embodiment, a ratio of the vector direction to a function of the pressures on the nozzle wall is constant at given ratios of nozzle pressure to ambient pressure, such that a direct correlation between the nozzle wall pressures and vector direction is established.

Figure 4:
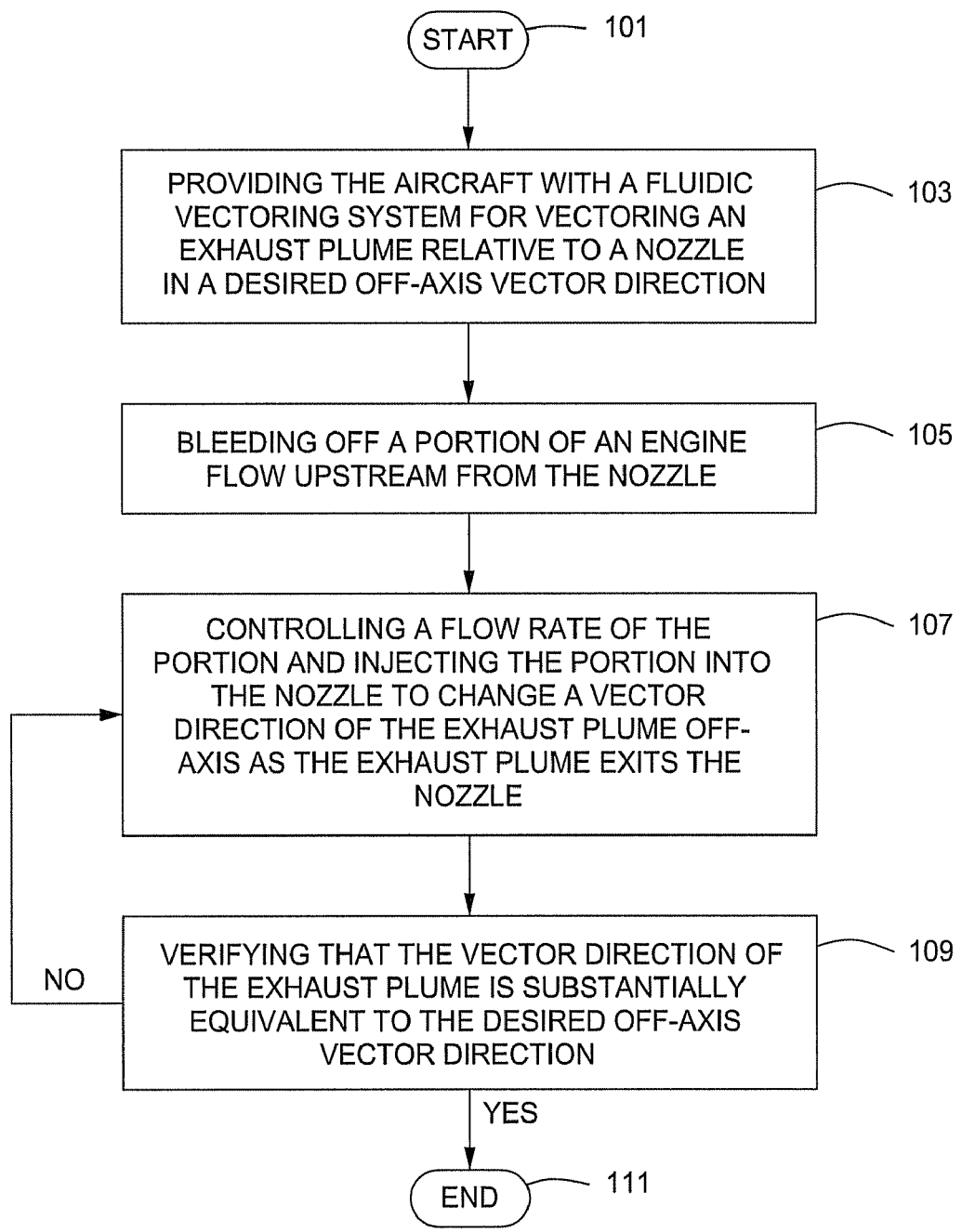
FIG. 4 is a high level flow diagram of one embodiment of a method constructed in accordance with the present invention.

Referring now to FIG. 4, one embodiment of a method of controlling vectored exhaust on an aircraft is disclosed. The method begins as indicated at step 101, and comprises providing the aircraft with a fluidic vectoring system for vectoring an exhaust plume relative to a nozzle in a desired off-axis vector direction (step 103); bleeding off a portion of an engine flow upstream from the nozzle (step 105); controlling a flow rate of the portion and injecting the portion into the nozzle to change a vector direction of the exhaust plume off axis as the exhaust plume exits the nozzle (step 107); and verifying that the vector direction of the exhaust plume is substantially equivalent to the desired off-axis vector direction (step 109); before ending as indicated at step 111.

In other embodiments, step 107 may comprise input prediction based on one of vectoring test data and high fidelity computational fluid dynamics (CFD) analysis; and/or laterally injecting the portion such that the fluidic vectoring system manipulates a yaw of the aircraft. Step 109 may comprise sensing pressure inside the nozzle relative to ambient pressure, and correlating the sensed pressure to determine the vector direction of the exhaust plume; and/or sensing pressure on sidewalls of the nozzle upstream from a location where the portion is injected into the nozzle. Alternatively, the nozzle may be mechanically fixed such that it has no moving parts and the steps are mechanically non-invasive relative to the nozzle, and the fluidic vectoring system manipulates at least one of a pitch and a yaw of the aircraft.

While the invention has been shown or described in only some of its forms, it should be apparent to those skilled in the art that it is not so limited, but is susceptible to various changes without departing from the scope of the invention. For example, although the illustrated embodiment depicts a system for manipulating the horizontal yaw of an aircraft, it should be apparent to those skilled in the art that the invention may be readily adapted to manipulate the vertical pitch, a combination of yaw and pitch, or still other directional controls of an aircraft as well. Moreover, although the invention is shown and described with pressure-sensing verification means for verifying the vector direction produced, alternatively, the verification means may comprise an optical detection system for verifying the produced vector direction with appropriate feedback to the controller.

What is claimed is:

1. An aircraft, comprising:
   a flight control system for controlling flight of the aircraft, including an engine for producing an engine flow, a nozzle having an axis and located downstream from the engine for releasing an exhaust plume from the engine;
   a fluidic vectoring controller responsive to the flight control system for vectoring the exhaust plume relative to the nozzle in a desired off-axis vector direction; the fluidic vectoring controller controlling:
   a fluidic off-take system for bleeding off a portion of the engine flow, the fluidic off-take system having a valve for controlling flow of the portion of the engine flow;
   an injection system extending from the fluidic off-take system into the nozzle for injecting the portion of the engine flow into the nozzle to change a vector direction of the exhaust plume off-axis as the exhaust plume exits the nozzle;
   a verification system for verifying that the vector direction of the exhaust plume is substantially equivalent to the desired off-axis vector direction, the verification system comprising:
   pressure sensors mounted on interior side walls of the nozzle for measuring pressure at the interior side walls; and
   means for correlating the pressure sensed by the pressure sensors with the vector direction of the exhaust plume.

2. An aircraft according to claim 1, wherein the nozzle has an expansion section with side walls in which the injection system is located for manipulating a yaw of the aircraft with an injection rate of the portion of the engine flow, and the pressure sensors are located on the side walls within the expansion section.

3. An aircraft according to claim 1, wherein the injection system comprises injection ports in the side walls of the nozzle, and injection pressure sensors in the injection system downstream from the valve for sensing injection pressure inside the injection ports.

4. An aircraft according to claim 1, wherein the injection system comprises injection ports in the side walls of the nozzle, and the pressure sensors are located upstream of the injection ports relative to the exhaust plume.

5. An aircraft according to claim 1, wherein the fluidic vectoring controller uses a prediction method for determining injected flow inputs required to obtain the desired off-axis vector direction, and the verification system provides a feedback loop to the fluidic vectoring controller to confirm that the desired off-axis vector direction was actually produced.

6. An aircraft according to claim 1, wherein the nozzle is mechanically fixed such that it has no moving parts, and the fluidic vectoring controller is mechanically non-invasive relative to the nozzle.

7. An aircraft according to claim 1, wherein the fluidic vectoring controller manipulates at least one of a pitch and a yaw of the aircraft.

8. An aircraft according to claim 1, wherein the portion of the engine flow is bled from engine bleed ports, the injection system is located downstream of the valve and laterally reintroduces the portion into a path of the exhaust plume flowing through the nozzle, and wherein the valve comprises a plurality of fluidic actuation valves.

9. A method of vectoring exhaust on an aircraft, comprising:
   (a) providing the aircraft with a fluidic vectoring system for vectoring an exhaust plume relative to a nozzle in a desired off-axis vector direction;
   (b) bleeding off a portion of engine flow;
   (c) controlling a flow rate of the portion and injecting the portion into the nozzle injection ports in a side wall of the nozzle to change a vector direction of the exhaust plume off-axis as the exhaust plume exits the nozzle; and then
   (d) verifying that the vector direction of the exhaust plume is substantially equivalent to the desired off-axis vector direction by sensing pressure on interior portions of the side wall of the nozzle, and correlating the sensed pressure to determine the vector direction of the exhaust plume.

10. A method according to claim 9, wherein step (c) comprises input prediction based on one of (a) vectoring test data and (b) high fidelity computational fluid dynamics (CFD) analysis.

11. A method according to claim 9, wherein step (c) comprises measuring injection pressure at the injection ports.

12. A method according to claim 9, wherein the nozzle has an expansion section and step (d) comprises sensing pressure on the interior of the side wall within the expansion section.

13. A method according to claim 9, wherein step (d) comprises sensing the pressure on the interior of the side wall of the nozzle upstream from injection ports.

14. A method according to claim 9, wherein the nozzle is mechanically fixed and has no moving parts, steps (a) through (d) are mechanically non-invasively relative to the nozzle, and the fluidic vectoring system manipulates at least one of a pitch and a yaw of the aircraft.

* * * * *